United States Patent [19]
MacKelvie

[11] Patent Number: 5,376,410
[45] Date of Patent: Dec. 27, 1994

[54] MATERIAL SURFACE MODIFICATION

[76] Inventor: Winston R. MacKelvie, Box 1156, Knowlton, Quebec, Canada, J0E 1V0

[21] Appl. No.: 769,649

[22] Filed: Oct. 2, 1991

[51] Int. Cl.⁵ .............................................. B05D 3/12
[52] U.S. Cl. .................................. 427/290; 427/292; 427/356; 427/414
[58] Field of Search ............... 428/582, 609, 100, 223; 427/292, 290, 356, 414; 156/91, 219, 257

[56] References Cited

U.S. PATENT DOCUMENTS 4,005,991  2/1977  Uebayasi et al. .................... 428/609
4,794,028  12/1988  Fischer ................................ 428/100

Primary Examiner—Shrive Beck
Assistant Examiner—Benjamin L. Utech

[57] ABSTRACT

There is provided a method for treating a surface which is to be bonded to another surface, the method comprising displacing a portion of the surface material to a position such that the displaced material, while remaining an integral part of the surface, forms a burr which is adapted to mechanically engage a flexible material placed adjacent thereto to thereby provide a mechanical interlocking action.

4 Claims, 2 Drawing Sheets

MATERIAL SURFACE MODIFICATION

The present invention relates to surface modification and more particularly, relates to a method of preparing a surface for adhesion to a further surface.

It is known in the art that one of the most important factors in the successful bonding of one material to the same or another material is surface preparation. Thus, it is common to employ some form of mechanical or chemical surface preparation such as abrasive blasting or chemical treatment to remove surface coatings, (oxides or other contaminants).

When a surface is prepared by use of abrasives (sand blasting, sanding, etc.) the surface effect is highly random when viewed in microscopic detail, with each differently sized and oriented abrasive particle being in contact with the material surface at different angles to leave different imprints or pits, but not in an engineered or optimum manner. Other mechanical preparation such as wire brushing, grinding or machining also leave roughened surfaces and do not provide for optimization of the surface for a subsequent bonding process. Furthermore, these processes do not address the needs of surface preparation wherein the materials that are to be bonded are so dissimilar that the adhesive bonding for most surfaces cannot be optimized. This is frequently the case with materials such as plastics.

It is an object of the present invention to provide a method of surface preparation wherein the surface can be optimized for subsequent adhesion.

According to one aspect of the present invention, there is provided a method of treating a surface which is to be bonded to another surface which includes the step of displacing a portion of the surface material while the displaced portion remains an integral part of the surface, the displaced material providing a burr which provides a key for a material to mechanically interlock therewith.

In another aspect of the present invention, there is provided a method of treating a surface which is to be bonded to another surface which includes the step of displacing a portion of the surface material while remaining an integral part of the surface, the displaced material forming a hook or loop such that the hook or loop will mechanically engage a flexible material placed adjacent thereto to provide a mechanical interlocking action.

In a further aspect of the invention, there is provided a product which has been treated to provide an optimized surface for bonding to another surface, the treated surface having a portion of the material thereon displaced to a position such that a flexible material placed adjacent thereto will mechanically interlock with the displaced portion.

In greater detail, the surface is treated by "keying" the surface of the material to cut or plow a path/groove/channel/furrow into the surface and displacing the material from the groove or channel to a position generally above the plane of the surface but permitting the material to remain attached thereto. As such, this raises a "burr" which can provide a grip or key for later bonding of the surface.

Following the process of this invention, the materials' surface can be modified to include multiple burrs. The burrs can be designed to be of a specific shape and/or size and/or cross-section to permit surface keying for specific requirements.

The advantage of this process is that the surfaces can be modified by displacing the material to form the burrs in the size, quantity and location required. As previously mentioned, the burrs produced may be formed to a desired shape and size for the desired end purpose. To this end, different combinations may be utilized depending upon the end use. Frequently, when using a liquid or flowable adhesive for different materials, it is difficult to optimize the adhesive since the adhesive may be suitable for one of the materials but not quite as suitable for the second material and therefore not have the adhesive strength. Using the process of this invention, the flowable adhesive will flow beneath the displaced material and once it is hardened, there is not only a chemical interaction but a mechanical bonding force.

In one embodiment, this invention can be practiced utilizing heretofore difficult to adhere plastic material such as polyethylene and TPFE. In this embodiment, the surface of the plastic material is treated to provide the burrs and the adhesive material placed on the surface. The adhesive material will cure and be mechanically interlocked with the surface of the plastic material. The number and shape and thicknesses of the burrs can be controlled to provide the desired mechanical strength. Utilizing this method, two incompatible plastic materials could be adhered together using the assistance of a mechanical interlocking action.

It is also within the scope of this invention to be able to adhere the treated surface to other materials. One can, for example, envisage the use of sheets of fibrous material whereby the burrs would interlock with the fibers. Similarly, even the use of two part surfaces such as metals, using a specifically designed interlocking mechanism through the design of specific burrs could be utilized. The burrs may be formed to a hook or loop configuration such that assembly pressure applied to the materials bonded together will cause the burrs to crush about one another to form an interlocked matrix.

It can also be envisaged that other media such as organic or inorganic fibers can be easily incorporated into the adhesive to provide a locking action in addition to that provided by the adhesive itself. The fibers can either lock between the adhesive and the treated surface or between the two treated surfaces.

In a further embodiment, typical different physical/chemical actions may be combined. Thus, one could form the burrs on the surface of a metallic material which is to be bonded to a relatively low melting plastic material. If the metallic material is heated, and placed in contact with the plastic material, the action could be such to cause each burr to melt its way into the plastic which will subsequently flow about the burr and upon solidifying will entrap and imbed each burr so as to provide a very strong mechanical interconnection. In this manner, materials can be joined where no suitable adhesive exists or alternatively this embodiment can be employed in conjunction with an adhesive.

As previously mentioned, the burrs may be formed in a quantity, shape and size according to the end result desired. The burrs can thus be engineered for the specific properties required of the composite. The burrs can be formed either in a random pattern or in a highly regular pattern which would allow a high percentage of engagement of opposing burrs onto surfaces.

BRIEF DESCRIPTION OF THE DRAWINGS

Having thus generally described the invention, reference will be made to the accompanying drawings, illustrating embodiments thereof, in which.

DESCRIPTION OF THE PREFERRED EMBODIMENTS

Figure 1:
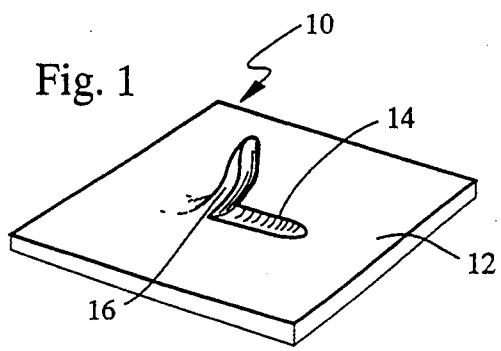
FIG. 1 is a perspective view of a piece of material treated according to the present invention.

Referring to FIG. 1, there is illustrated a section 10 of material having a surface 12. Wherein surface 12, a groove 14 is formed by suitable means to raise a burr 16 which remains integrally attached to the material. As may be seen from FIG. 1, the groove/furrow/channel has a somewhat elongated configuration although this is a function of the shape of the tool and amount of material removed.

Figure 2:
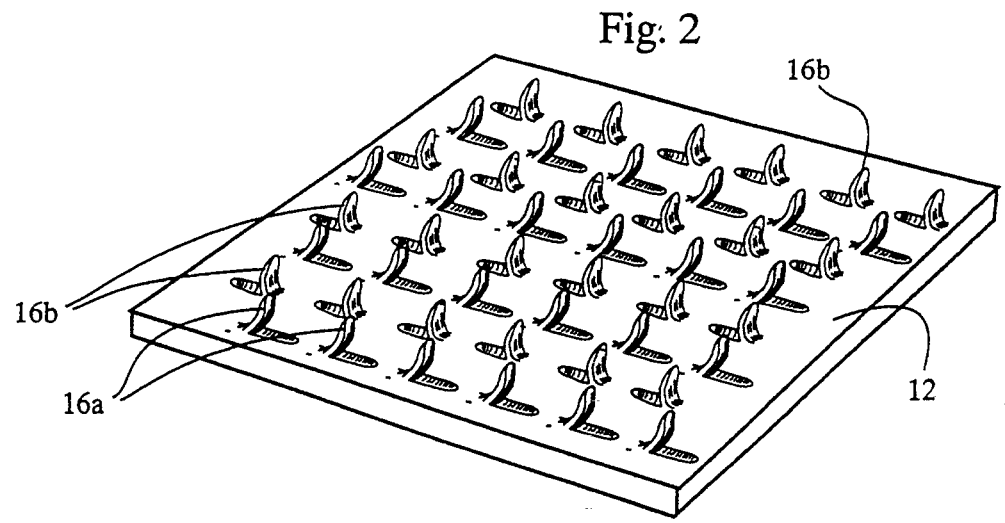
FIG. 2 is a perspective view of a larger piece of material treated similarly to FIG. 1.

FIG. 2 illustrates a larger surface which has been treated according to the present invention. Surface 12 has a plurality of burrs formed therein; the burrs are formed in two different rows and are designated by reference numerals 16a and 16b. In this respect, all the burrs 16a have been formed by displacing material from the right to the left as seen in FIG. 2 while those burrs 16b have been formed by displacing material from the left to the right.

Figure 3:
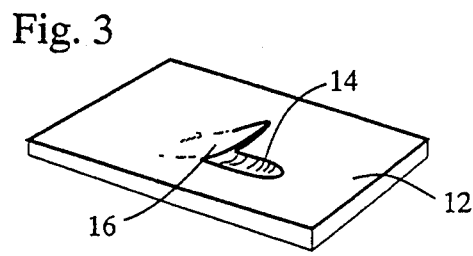
FIGS. 3, 4 and 5 are perspective views of a piece of material showing various forms of burrs created according to the invention.

FIGS. 3 to 6 illustrate the formation of a burr as shown in FIG. 1. Thus, initially, as seen in FIG. 3, burr 16 may be created by displacement of material only to a slight extent such that the burr forms a generally acute angle with surface 12.

Figure 4:
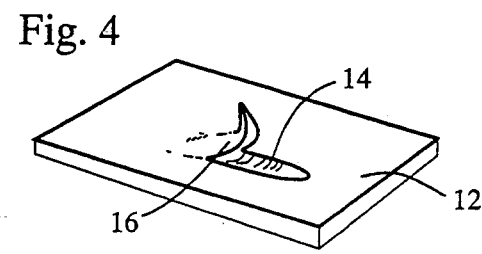

As shown in FIG. 4, burr 16 may be displaced to a greater extent such that it slightly curls back on itself.

Figure 5:
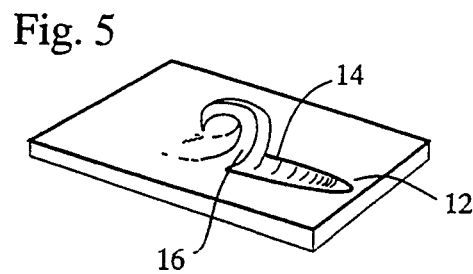

In FIG. 5, burr 16 has been displaced to a substantial extent to form a hook like configuration. This particular configuration can be highly advantageous in some applications to provide a great deal of strength between two surfaces.

Figure 6:
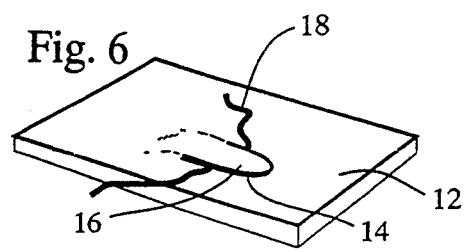
FIGS. 6 is a perspective view illustrating a further embodiment of the invention.

FIG. 6 illustrates embodiments similar to FIG. 3 but showing wherein a fiber 18 has become entrapped by burr 16 after clamping of surfaces together.

Figure 7:
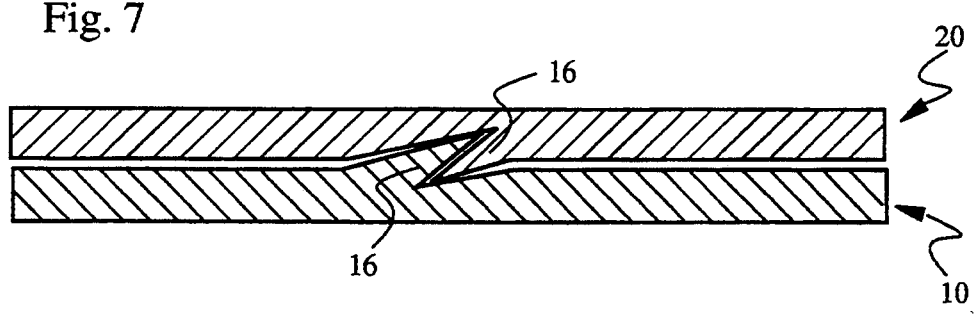
FIG. 7 is a cross sectional view of two pieces of material adhered following the practice of the invention.

In FIG. 7, there is illustrated how two pieces of material 10 and 20 are interlocked through burrs 16.

Figure 8:
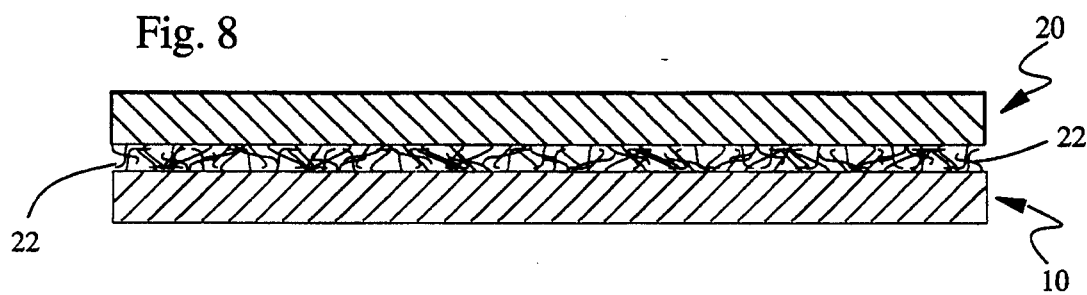
FIG. 8 is a cross sectional view illustrating a further embodiment of the invention.

In FIG. 8, the interlocking of pieces of material 10 and 20 is assisted by a fiber matrix 22 which may, for example, be part of an adhesive layer.

Figure 9:
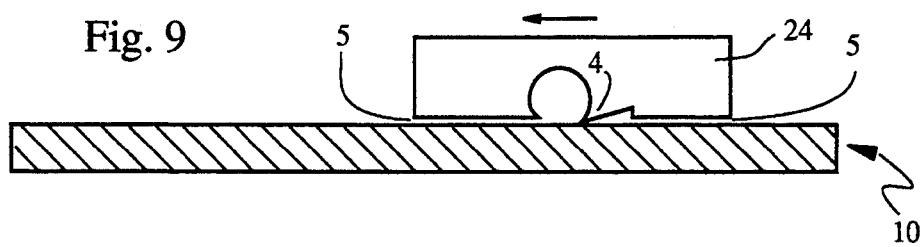
FIGS. 9 and 10 are side elevational views showing the formation of a burr.
Figure 10:
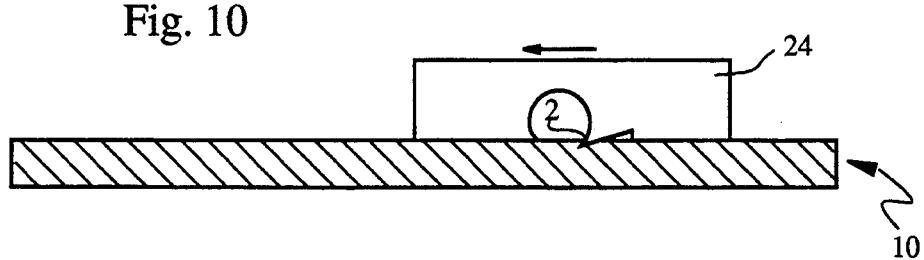

In FIGS. 9 and 10, a tool 24 is shown forming burrs 16 in material 10.

It will be understood that the above described embodiment is for purposes of illustration only and that changes and modifications may be made thereto without departing from the spirit and scope of the invention.

I claim:

1. A method of treating a first substrate which is to be bonded to a flexible material, comprising the steps of displacing a portion of the surface of the first substrate to a position such that the displaced material remains an integral part of the first substrate by forming a groove in the surface of the first substrate and allowing the material displaced from the groove to curl back onto itself, whereby said displaced material will mechanically engage a flexible material placed adjacent thereto to provide a mechanically interlocking action.

2. The method of claim 1 wherein the first substrate is metal.

3. The method of claim 1 including the step of applying an adhesive to said treated first substrate, said adhesive interlocking with said displaced material.

4. The method of claim 1 including the step of forming the groove with a tool which limits the depth of said groove.

* * * * *